[54] METHOD FOR COATING CONTINUOUSLY ADVANCING SUBSTRATE

[75] Inventor: Ronald L. Schwenninger, Cumberland, Md.

[73] Assignee: PPG Industries, Inc., Pittsburgh, Pa.

[22] Filed: Nov. 24, 1972

[21] Appl. No.: 309,049

[52] U.S. Cl. ............... 427/314; 118/314; 118/315; 118/323; 427/399; 427/424
[51] Int. Cl. ............................................. C23c 7/00
[58] Field of Search ............. 117/104, 105.1, 105.3, 117/105, 124 A, 124 B; 118/314, 323, 315

[56] References Cited
UNITED STATES PATENTS

| | | | |
|---|---|---|---|
| 2,588,125 | 3/1952 | Knowland et al. | 117/105.3 |
| 2,696,449 | 12/1954 | Ericks et al. | 117/105.3 |
| 2,729,191 | 1/1956 | Ransburg | 118/314 |
| 3,184,328 | 5/1965 | Wagner et al. | 117/105.3 |
| 3,231,353 | 1/1966 | Julio | 117/105.3 |
| 3,282,273 | 11/1966 | Johnston et al. | 118/323 |
| 3,793,054 | 2/1974 | Franz | 117/105.3 |
| R25,767 | 4/1965 | Auffenorde et al. | 117/105.3 |

*Primary Examiner*—Charles L. Bowers, Jr.
*Attorney, Agent, or Firm*—E. Kears Pollock; Donald Carl Lepiane

[57] ABSTRACT

Applying a coating composition onto a linearly advancing substrate from at least two spray guns which cyclically traverse the substrate in the direction perpendicular to the movement of the substrate, and which are spaced so as to satisfy the harmonic relationship between the speed of the advancing substrate, the frequency of the spray gun cycles and the spacing of the spray patterns at the surface of the advancing substrate, as defined by the following equation:

$$S_p = \frac{\overset{i}{R_s}}{F_m} \frac{Ng + n}{Ng}$$

wherein:

$S_p$ = the spacing between the lines of intersection of the surface plane of the advancing substrate and the imaginary planes generated by the transversely moving axes of adjacent spray patterns, in inches;

$R_s$ = substrate or ribbon speed, in inches per minute;

$N_g$ = the number of spray guns;

$n$ = any positive or negative whole integer other than $n=N_g$ or multiples of $n=N_g$; and $F_m$ = the cycle speed or frequency of reciprocation of the spray guns, in cycles per minute.

Excess coating material is removed from the area of application by means of vacuum hoods, the area being suitably sealed to ensure that the rate of exhuast is substantially uniform across the width of the substrate and that the exhaust moves only in the direction parallel to the movement of the substrate.

19 Claims, 7 Drawing Figures

METHOD FOR COATING CONTINUOUSLY ADVANCING SUBSTRATE

BACKGROUND OF THE INVENTION

This invention relates to a method and apparatus for coating a continuously advancing substrate, and more particularly, to a method and apparatus for applying a uniformly thick coating over substantially the entire surface of a continuously advancing substrate. This invention, in general, can be applied to any coating system which comprises two or more cycling spray nozzles that traverse an advancing substrate for the purpose of applying thereon a coating of any liquid, atomized liquid, solid particulate or gaseous substance. The invention is particularly useful for coating a continuously advancing glass ribbon with a coating material that alters the optical properties (transmission, absorption and reflection) of the ribbon such that non-uniform coating thicknesses over the surface of the ribbon would be noticable. in a sophisticated version of this invention the substrate would comprise a continuously advancing ribbon of glass, such as a heated ribbon of float glass, and the coating material would comprise a composition capable of pyrolizing on contact with the hot glass surface to form a metal oxide coating that would alter the optical properties of the coated glass.

Prior to the present invention, continuously advancing substrates, including ribbons of glass, have been coated by various spraying techniques which involve spraying the substrate from a plurality spray nozzles which cyclically traverse the advancing substrate in a direction generally perpendicular to the direction of travel of the substrate. While such techniques are generally adequate for applying relatively thick coatings, wherein slight deviations in coating thickness are tolerable, they possess certain inherent characteristics which diminish their utility when coatings of extremely uniform thickness are required. One such inherent characteristic is a tendency for the discrete spray pattern of each respective traverse cycle of the spray guns to partially overlap the pattern of each preceding cycle. When this occurs the coating material is applied on the advancing substrate in the form transversely oriented "bands" of varying thickness. While such "bands" may not be noticeable when the coating material is a relatively thick opaque layer, the "bands" will be quite noticeable if the coating were thin enough so that the "bands" of varying thickness alternated between opaque and partially transparent thicknesses of coating material. Obviously, such "banding" can present a serious problem when the optical properties coating material are a function of the thickness and the uniformity of the coating.

Another inherent and often undesirable characteristic of reciprocating spray techniques of the above type is their tendency to apply more coating material near the center of the advancing substrate than near the side edges thereof, particularly when the coating material is of a nature that requires any excess coating material to be exhausted or otherwise removed from the atmosphere surrounding the substrate being coated. This causes lesser thicknesses of material to be coated near the edges of the substrate, which, in turn, can cause the optical properties near the edges of the substrate to be different from those nearer the center of the substrate. When this occurs, and when the utility of the coated substrate requires that it have a prescribed minimum deviation of optical properties across its width, it is necessary to trim the edge portions from the substrate. Obviously, this can result in enormous wastage depending upon how badly such "edge effect" manifests itself for a given product.

Still another characteristic associated with cyclically traversing spray coating apparatus is a tendency for a cloud of coating material to develop above the substrate being coated and in the path of the traversing spray guns. This often results in the deposition and build-up of the coating material on the traversing guns to the point where droplets or particles of coating material flake off the guns and spatter onto the substrate. SUch spattering causes readily noticeable discrete defects which, in turn, result in decreased yields of acceptable grade product.

In view of the foregoing, it is an object of this invention to provide new and improved methods and apparatus which overcome the deficiencies and disadvantages of prior art cyclically traversing spray coating systems.

It is another object to provide a spray technique and apparatus for applying a uniformly thick coating on a continuously advancing substrate.

Still another object is to provide a technique for coating a continuously advancing substrate, wherein the resulting coating is substantially free from "bands", "edge effects" and discrete defects caused by non-uniform coating thicknesses over the surface area of the substrate.

Another object is to provide a system for applying substantially band-free coatings on an advancing substrate.

Another object is to provide a system for reducing the "edge effect" associated with cyclically traversing spray techniques for coating a continuously advancing substrate.

Yet another object is to provide a system for reducing the number of discrete defects in a coating that is applied to a continuously advancing substrate by means of spray guns which traverse the substrate during the coating application.

SUMMARY OF THE INVENTION

In accordance with the present invention, the elimination of banding is accomplished by spraying a coating composition onto a continuously advancing substrate from at least two spray guns which cyclically traverse the moving substrate in the direction perpendicular to be movement of the substrate, and which are spaced so as to satisfy the harmonic relationships between the speed of the moving substrate, the frequency of the spray gun cycles and the spacing of the spray patterns at the surface of the moving substrate, as defined by the following equation:

$$S_p = \frac{R_s}{F_m} \left( \frac{Ng+n}{Ng} \right)$$

wherein:
$S_p$ = the spacing between the lines of intersection of the surface plane of the substrate and the imaginary planes generated by the transversely moving axes of adjacent spray patterns, in inches;
$R_s$ = substrate or ribbon speed, in inches per minute;
$N_g$ = the number of spray guns; and
$n$ = any positive or negative whole integer other than $n=Ng$ or any multiple of $n=Ng$; and $F_m$ = the cycle speed or frequency of reciprocation of the spray guns, in cycles per minute.

Heavy banding caused by the reinforcement of banding from one spray gun with banding from another is avoided by this invention.

With respect to the above relationships, it is preferred that $n=1$ and that the spray guns be mounted for cyclic traverse such that the guns are disposed in a generally linear pattern substantially parallel to the length of the advancing substrate. Such generally linear arrangement of the spray guns is desirable since any deviation from this pattern will result in at least some "beat frequencies" or "bands". However, since for certain coating applications minor "banding" will not be readily detectable by the naked eye, it is permissible to mount adjacent spray guns out of line with respect to the advancing substrate, so long as the angle between the line of travel of the substrate and an imaginary line drawn through respective adjacent spray guns does not exceed about 45°.

Further advantages of the present invention are accomplished by substantially enclosing or otherwise sealing the air space between the edges of the advancing substrate and the cycling spray guns, and by exhausting excessive coating material from the enclosed air space at a rate which is substantially uniform across the width of the substrate. This may be accomplished, for example, by mounting exhaust hoods across the width of the substrate, both upstream and downstream of the cycling spray guns, and by providing suitable baffles near the edges of the substrate (i.e., the ends of the exhaust hoods). In a preferred embodiment, the baffles are arranged such that substantially all of the air which is drawn from the surrounding atmosphere and into the air space being exhausted enters the air space from above the surface of the substrate, and such that substantially all of the air and coating material that is exhausted moves to the upstream and downstream hoods on a path substantially parallel to the length of the substrate. Thus, the baffles are preferably arranged so that substantially none of the air and coating material which moves over the surface of the substrate and out through the exhaust hoods moves from the edges toward the center of the substrate.

Still further advantages of the present invention are attained by disposing elongated baffles between adjacent spray guns so as to define relatively narrow slots through which the respective spray guns project and travel during their traverse across the substrate. The baffles serve to restrict the passage through which air can enter into the air space between the exhaust hoods, thereby causing the air to move through the slots and past the guns at a relatively high velocity. This rush of air past each spray gun has a tendency to prevent the coating material from building up on the guns. This cleansing effect, in turn, diminishes the likelihood of particles flaking off the guns and causing discrete coating defects.

As indicated above, the present invention is particularly useful for coating a heated sheet of float glass with a metal oxide by applying to the hot sheet a coating composition capable of pyrolyizing on contact with the hot glass surface. The coating composition is so selected as to alter the optical properties (transmission, absorption and reflection) of the radiant energy in the visible, ultraviolet and infra-red bands of wavelengths in such a manner that the uniformly coated clear glass sheet has substantially the same optical properties to the naked eye as a glass sheet of colored glass composition that includes coloring ingredients substantially uniformly dispersed throughout the glass volume.

One of the needs for the present invention arose from the requirement of architects for glass panels of different colors to blend with the colors of walls in buildings they design. In the past, each different colored glass was produced by mixing and melting a different set of batch ingredients in a glass melting tank.

It is a time consuming and costly operation to change the composition of molten glass in a tank to yield a new glass of a different color. Several days are usually needed from the time batch ingredients required to produce a new color are first added to the tank until the glass issuing from the tank is changed sufficiently to yield a color-homogenous product. It may even be necessary to drain a tank and refill it with new ingredients particularly when production is changed from a colored glass to a clear glass.

The present invention permits the continuous manufacture of a clear or substantially colorless glass composition during the entire life of the tank without interruption for changing batch ingredients. Without stopping the continuous delivery of the glass ribbon from the tank, whenever it is desired to modify the apparent color of the glass or in some cases its radiant energy transmission, the ribbon is coated with a uniformly thick film to provide the clear glass ribbon with any one of several colored films which impart an appearance characteristic of transparent colored glass compositions.

The present invention is particularly useful to impart a metal oxide coating on a continuous ribbon of float glass immediately after the glass ribbon is formed and during the time the ribbon is being delivered at a controlled rate through a zone of controlled temperature sufficient to pyrolize the metallic film forming composition into a metal oxide having requisite properties and before the ribbon surface developes defects due to handling or exposure to a surface contaminant. The temperature of the glass is usually between 500° and 1,200°F. when the coating composition is applied.

The present invention is particularly suitable to produce a family of coatings, each composed of a mixture of metal oxides having desired optical properties that are usually found in colored glass compositions, on a continuous ribbon of float glass that is essentially free of coloring ingredients except for impurities incorporated in the batch for making commercial float glass of soda-line-silica composition.

The durability of metal oxide films formed by pyrolizing a film forming composition directly onto a heated surface of a continuous ribbon of float glass delivered to a spray station from a bath of tin-containing molten metal, such as molten tin or molten tin alloy conventionally used in a float glass manufacturing operation, is superior to those produced on other types of glass. This superior durability is believed to be due to the presence of tin vapor in the bath, which deposits on the upper surface of the ribbon and which oxidizes immediately on exposure to the oxidizing atmosphere of the coating station.

In a typical float glass operation, a continuous ribbon is drawn either along the surface of or through a bath of molten metal, preferably the former. The bath is usually tin or a tin-containing alloy, and preferably tin, contained in a reducing atmosphere consisting primarily of nitrogen and hydrogen. The bath is maintained at an elevated temperature so that the glass ribbon in contact therewith is sufficiently soft to flow or fire-polish out surface irregularities. The temperature of the bath is progressively decreased along the direction of ribbon movement to permit the ribbon to harden with its surface smooth enough to avoid the need for grinding and polishing. The hardened glass leaves the end of the bath and travels through an annealing lehr on conveyor rolls.

For reasons described above, the float process causes the faces of float glass ribbon to be rich in tin and/or tin oxides. It is believed that this thin-tin-containing surface layer enhances the adhesion of metal oxide films pyrolized thereon and thus permits the formation of films of great durability.

The coloring coating compositions suitable for use in providing the optical properties of colored glass to a clear glass substrate comprise compositions containing metal salts dissolved in an organic vehicle, preferably one that is non-flammable and non-explosive at the temperature of applying the filming composition. The composition is stored under pressure in an enclosed system and delivered to two or more spray guns mounted for reciprocation in the direction perpendicular to the path of travel of the float glass ribbon. The spray guns, which are insulated from the hot environment of the coating station to keep the solution of coating composition in the liquid state and maintain the metal concentration at the desired level until the spray is emitted from each spray gun, apply the spray composition toward the glass ribbon at a rapid rate so as to have the coating composition contact the glass before its solvent is completely evaporated. Alternatively, vapors or powder reactants may be dispensed.

Preferably the distance from spray gun to ribbon surface is about one foot.

Methylene chloride ($CH_2CL_2$) is an excellent solvent for many organometallic salts used, has a sufficiently high boiling point to remain a liquid until it contacts the hot glass ribbon and is sufficiently non-explosive and non-flammable to be safe for handling. Furthermore, this solvent appears to be chemically stable and does not break down into corrosive compounds such as HCl and methane when precautions suggested herein are followed.

Several other aliphatic and olefinic halocarbons and halogenated hydrocarbons meet these requirements. These include:

methylene bromide ($CH_2Br_2$)
carbon tetrachloride ($CCl_4$)
carbon tetrabromide ($CBr_4$)
chloroform ($CHCl_3$)
bromoform ($CHBr_3$)
1,1,1-trichloroethane ($Cl_3C—CH_3$) perchlorethylene ($Cl_2C=CCl_2$)

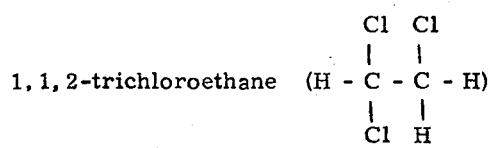

dichloroiodomethane ($CHCl_2I$)

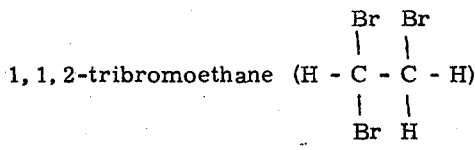

trichloroethylene ($Cl_2C=CClH$)
tribromoethylene ($Br_2C=CBrH$)

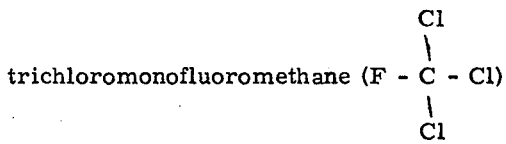

hexachloroethane ($Cl_3C — CCl_3$)
1,1,1,2-tetrachloro-2-fluoroethane ($FCl_3C — CHClF$)
1,1,2-trichloro-1,2-difluoroethane ($FCl_2C — CHClF$)
tetrafluorobromoethane ($F_3C — CFBrH$) or ($F_2BrC — CF_2H$)
hexachlorobutadiene ($CCl_2=CCl—CCl—CCl_2$) and
tetrachloroethane ($Cl_2HC — CHCl_2$).

In addition, mixtures of two or more of the aforesaid organic solvents that are compatible may be used to develop a solvent incorporating an improved combination of desirable features.

Other solvents having superior dissolving power for the metal salts used such as various mixtures of one or more organic polar compounds such as an alcohol containing one to four carbon atoms and one hydroxyl group and one or more aromatic non-polar compounds taken from the class consisting of benzene, toluene and xylene may be used with caution. However, their volatility makes them more difficult to control in a hot environment than the solvents listed above, even though their superior solubility properties make them more desirable when applied in a relatively cold atmosphere where discrete sheets are coated.

While many organometallic salts, such as the acetates and 2-ethyl hexoates, are suitable to pyrolize on contact with hot glass to form a metal oxide film at a hot surface thereof, superior films result from applying the acetylacetonates of various metals in various relative concentrations in an organic vehicle to produce the desired colored appearance to a clear glass substrate.

Various metal salts have well known film forming properties. U.S. Pat. No. 3,244,547 to L. E. Orr et al., assigned to PPG Industries, Inc. and U.S. Pat. No. 2,564,708 show compositions capable of forming colored metal oxide films. However, to simplify storage and mixture problems, and to produce films having superior durability, it is convenient to use a family of compositions containing one or more of the acetylacetonates of cobalt, iron and chromium. Films having different colors resembling those of commerical colored glasses result from varying the relative concentrations of the ingredients in mixtures of these ingredients or from omitting one or more of the ingredients.

The invention will be understood more clearly in the light of a description of illustrative embodiments that follows. In the drawings that form part of the description, and wherein like reference numbers refer to like structural elements.

Figure 1:
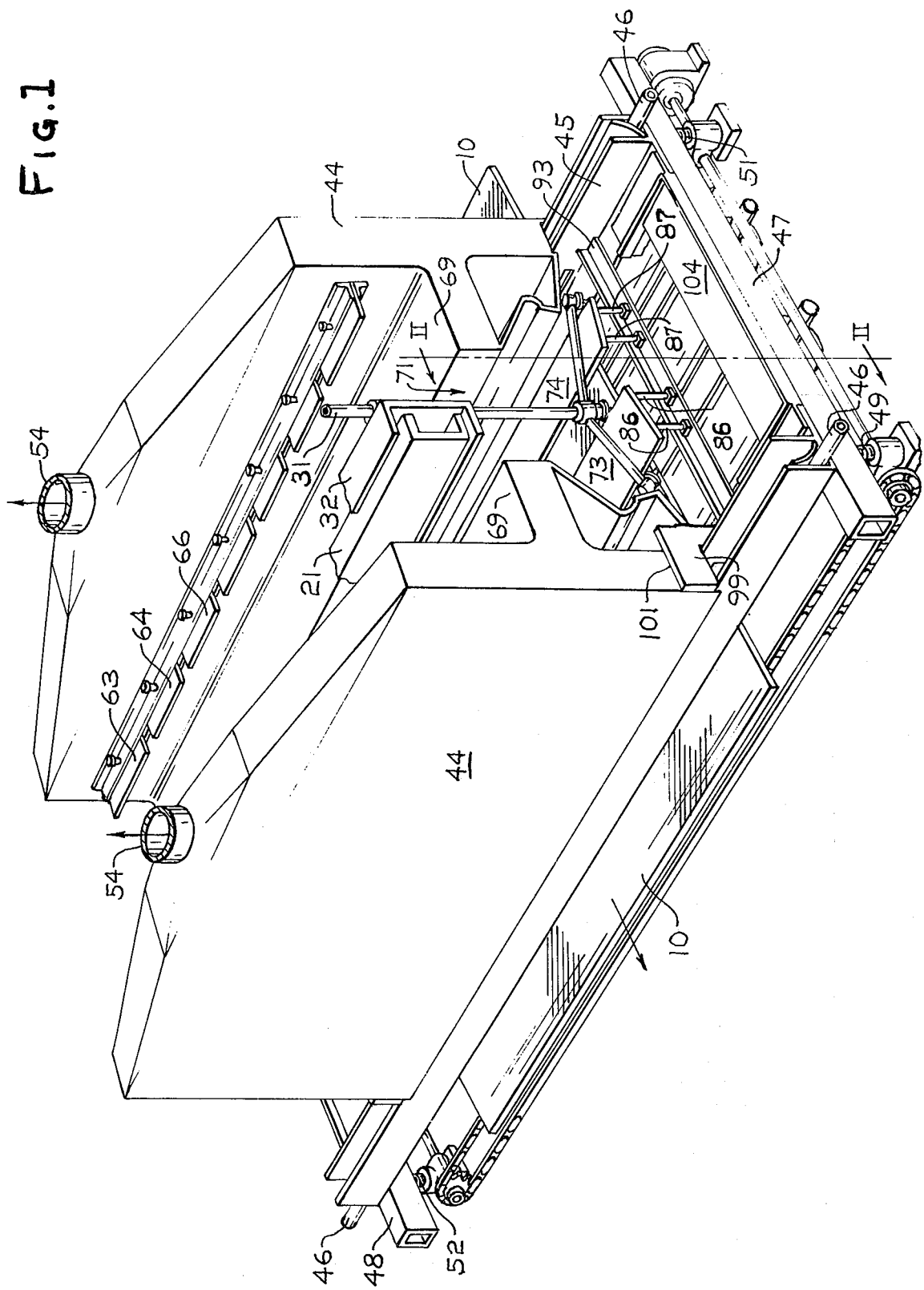
FIG. 1 is a fragmentary perspective view of a spray coating apparatus embodying certain principles of the present invention.
Figure 2:
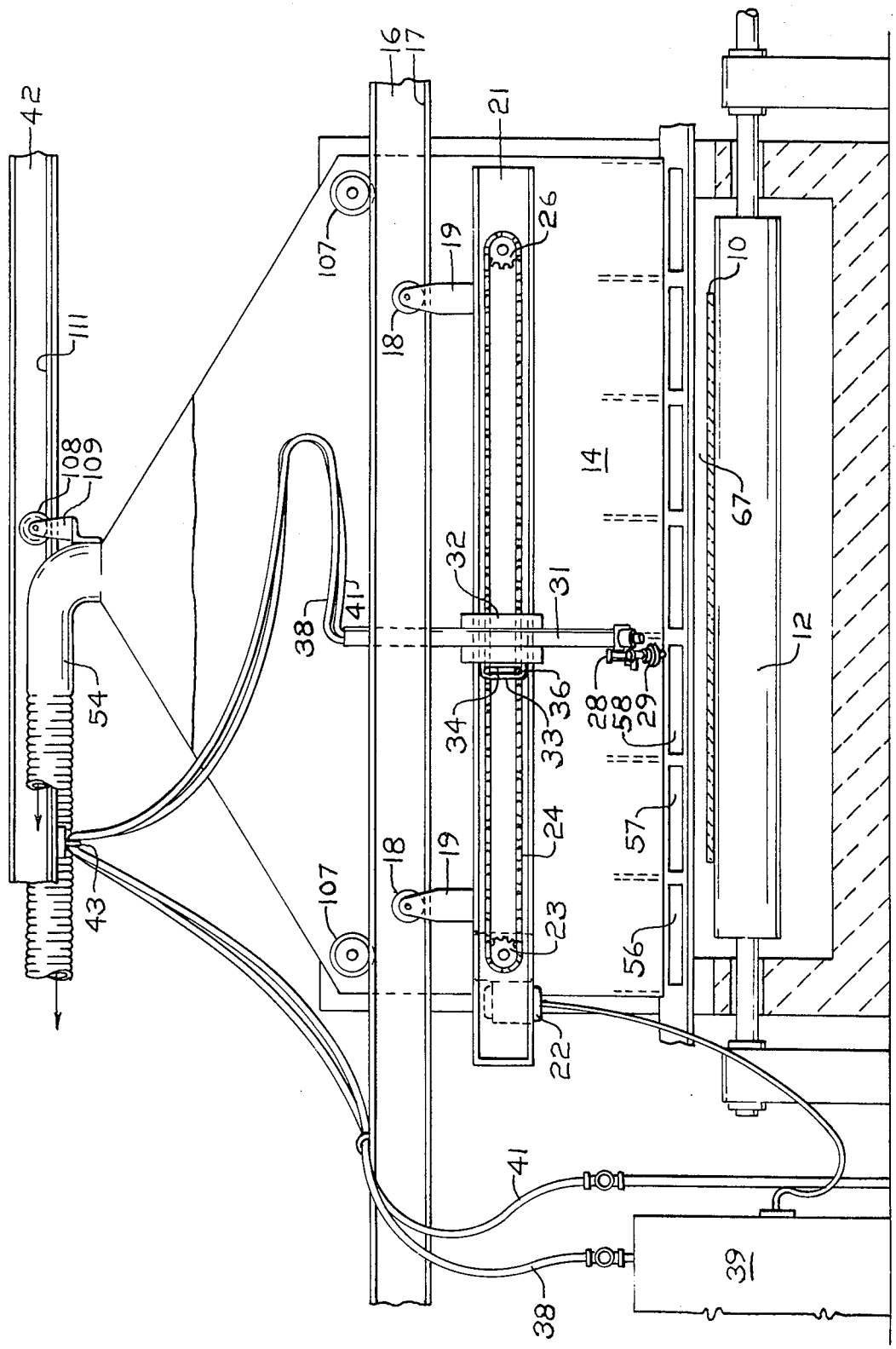
FIG. 2 is a sectional view, with portions added, removed and broken away for the purpose of illustration, taken along line II—II of FIG. 1.
Figure 3:
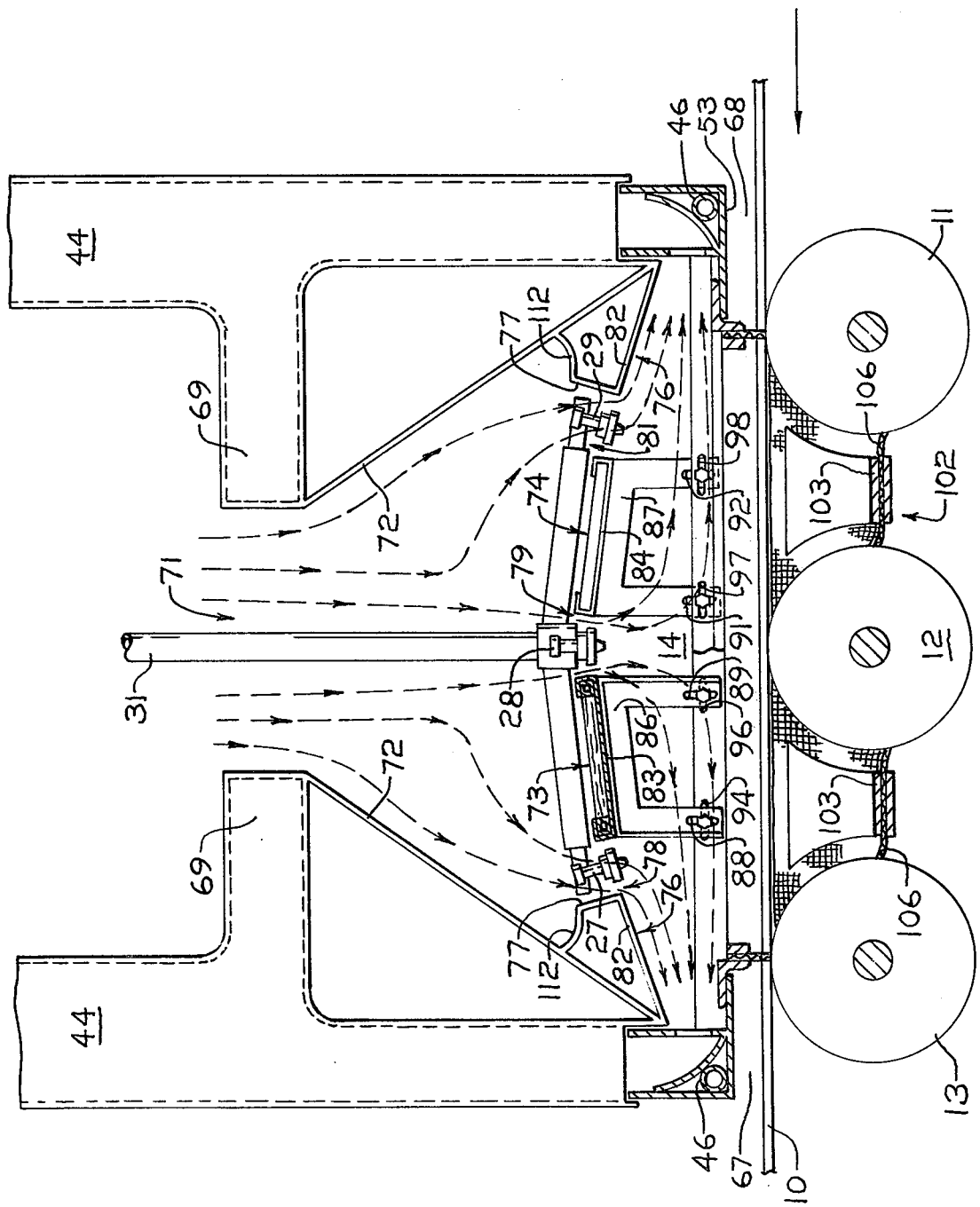
FIG. 3 is an enlarged side elevational view of the apparatus of FIG. 1, with portions removed, broken away and shown in section for the purpose of illustration.

Referring now to the drawing, particularly FIGS. 1, 2 and 3, a continuous glass ribbon 10 is shown supported on a plurality of rolls 11, 12, 13, etc. The rolls, which are suitably journaled and driven by conventional roll driving means connected to a driving motor (not shown), exert a tractive force on the ribbon of sufficient magnitude to convey the ribbon through a spray coating zone or spray chamber 14 which embodies the present invention and which is described more fully hereinbelow. In a typical utilization of the present invention, the rolls 11, 12, 13, etc., would form part of a transporting means that conveys newly formed float glass along a predetermined path from a conventional float tank (not shown) located upstream of the spray chamber 14, through the spray chamber and then through a conventional annealing lehr (not shown) located downstream of the spray chamber. Such an arrangement is disclosed, for example, in U.S. Pat. No. 3,652,246 to J. E. Michelotti et al., assigned to PPG Industries, Inc.

As shown most clearly in FIG. 2 a horizontal channel beam 16 extends transversely over and beyond the sides of the path taken by the glass ribbon 10. The beam 16 is supported on vertical legs (not shown) disposed beyond the lateral sides of the spray chamber 14. The lower flange of the channel beam forms a lower track 17 supporting wheels 18 attached to brackets 19. The latter extended downward from the wheels 18 and are attached at their lower end to a cross beam structure 21.

A motor 22 is supported on the cross beam structure 21, and is coupled to a drive sprocket 23. The latter, in turn, is connected through a chain drive 24 to a driven sprocket 26. Sprockets 23 and 26 are rotatably mounted to the cross beam structure 21 for rotation about parallel axis extending lengthwise of the path of movement for the glass ribbon 10. The cross beam structure 21 is superimposed over the spray chamber 14 in which means for applying a film forming composition is disposed in spaced relation to the path taken by the glass ribbon through the spray chamber.

Three conventional spray guns 27, 28, and 29 comprising spraying means are arranged with their respective spray orifices in a linear configuration substantially parallel to the path taken by the glass ribbon 10. Each of the spray guns 27, 28 and 29 is rotatably and swivelly supportd from a vertical rod 31 to facilitate adjusting the angle at which each respective gun orifice is directed to the upper surface of the ribbon.

The vertical rod 31 is adjustably mounted to an open bracket 32. The open bracket 32 contains a slotted member 33 having a vertical slot 34 adapted to receive a lug 36 carried by one of the links of the chain drive 24. The lug 36 interfits the vertical slot 34 to support the open bracket 32 adjacent the chain drive 24.

A water cooled manifold 37 is disposed in the distribution line for supplying coating material to the respective spray guns. Thus, each of the spray guns has a suitable hose connection through the manifold 37 to a flexible supply hose 38 attached to a fluid supply drum 39 (FIG. 2) in which spray composition is stored under pressure, and an air supply hose 41 connected to a source of pressurized air (not shown). Suitable valves (not shown) are included in the air and composition lines to discontinue the flow of air and spray coating composition to the respective spray guns whenever desired, such as when it is desired to revert to regular float glass production. Reopening the valves results in a resumption of the glass coating operation whenever desired, using the same or a different spraying composition.

An overhead beam 42 contains a hook 43 for supporting the flexible hoses 38 and 41 in a manner such as to permit the flexible hoses to follow reciprocation of the open bracket 32 in response to actuation of the chain drive 24 whenever motor 22 is operated. In this manner the motor 22 and chain drive 24 serve as means for reciprocating the spraying means along an axis transverse to the direction of the path taken by the float glass ribbon 10 in a plane spaced from the upper surface of said ribbon.

As indicated above, the spray guns 27, 28 and 29 are preferably arranged in a generally linear configuration substantially parallel to the path taken by the ribbon 10 to avoid banding completely. However, since for certain coating applications minor banding will not be detectable readily by the naked eye, it is permissible to mount adjacent spray guns out of line with respect to the advancing ribbon, so long as the angle between the path of travel of the ribbon and an imaginary line drawn through respective adjacent spray gun does not exceed about 45°.

Figure 5:
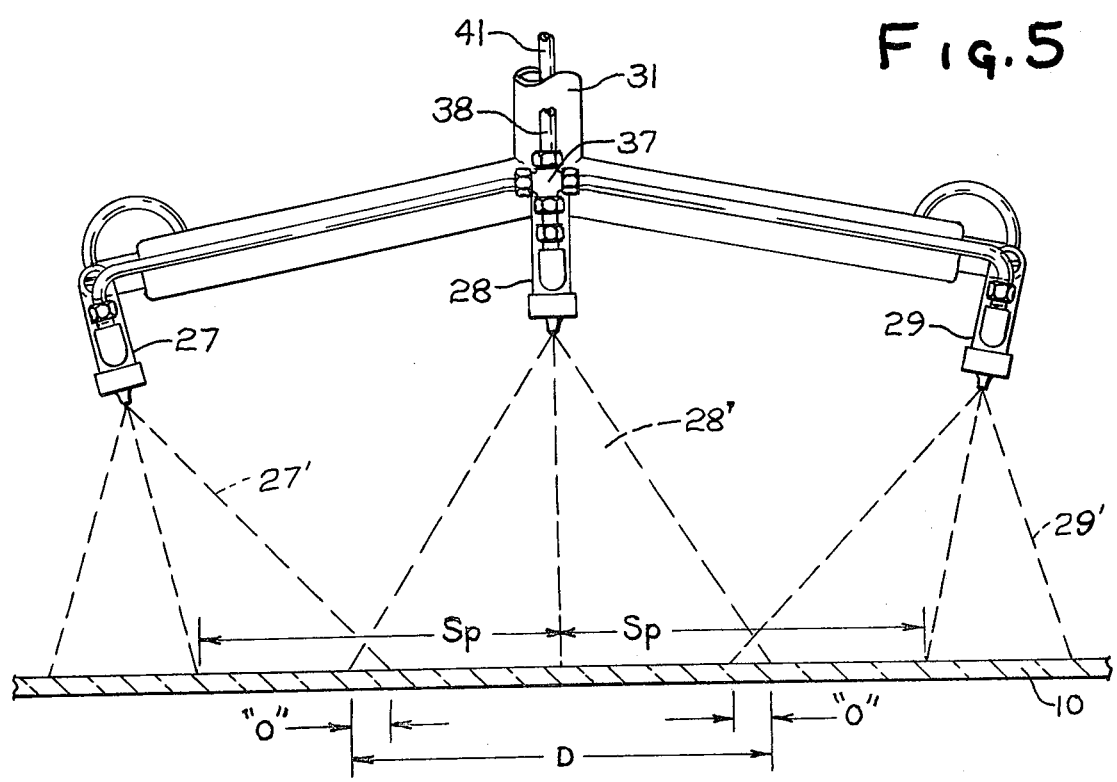
FIG. 5 is an enlarged partial elevational view of the spray guns shown in FIG. 3.

As illustrated in FIG. 5, the spray guns are disposed a predetermined distance above the ribbon, generally about 6 to about 14 inches, such that the generally conically shaped spray patterns 27', 28', 29' that are discharged from the respective guns overlap the spray pattern discharged from each adjacent gun. The desired amount overlap, "O", between adjacent spray patterns depends largely on the composition and the ultimate intended thickness of the coating material being employed. However, it is generally advisable to adjust the guns so that the outer edge of a given spray pattern overlaps the outer edge of an adjacent spray pattern by about 20 to about 40 percent, relative to the diameter, D, of the spray pattern 28' at the surface of the ribbon 10.

The guns are also arranged such that the spacing, $S_p$, measured at the surface of the ribbon between the lines of intersection of the surface plane of the ribbon and the imaginary planes generated by the transversely moving axis of each spray pattern satisfies the following equation:

$$S_p = \frac{R_s}{F_m} \left( \frac{Ng+n}{Ng} \right)$$

wherein:
- $R_s$ = substrate or ribbon speed, in inches per minute;
- $Ng$ = the number of spray guns;
- $n$ = any positive or negative whole integer other than $n=Ng$ or any multiple of $n=Ng$, $n$ preferably being 1; and
- $F_m$ = the cycle speed or frequency of reciprocation of the spray guns, in cycles per minute.

When used in connection with the coating of newly formed float glass, the spray chamber 14 is at a temperature in a temperature range sufficiently high to cause the film forming composition to react to form a colored metal oxide coating when the composition contacts the ribbon 10. Accordingly, the flexible hoses 38 and 41 are suitably insulated from direct exposure to the environmental heat within the spray chamber 14 by being encased within a steel-reinforced, teflon-lined, neoprene sleeve. The spray guns are also suitably insulated by wrapping in fiber glass insulation. The insulation serves as means to maintain the ingredients of the composition in a nonvolatile state until they are imparted from the spray gun orifices into the atmosphere of the spray chamber 14.

The cross beam structure 21 and the spray guns and all appurtenant equipment are readily removed from the position over the float glass ribbon 10 illustrated in the drawings to another position to one side of the path in a similar manner. To accomplish this object the wheels 18 are rolled along the lower track 17 until the cross beam structure 21 is entirely to one side of the volume between the enclosed atmosphere over the float tank (not shown) and the lehr (not shown). In this position, operators can perform maintenance on the spray guns and the flexible supply hoses and other structure without interfering with the production of regular float glass. Structural elements 16 through 21 thus serve as means to one side of said spray chamber 14 to permit maintenance of said spraying means without disturbing the production of float glass.

Figure 4:
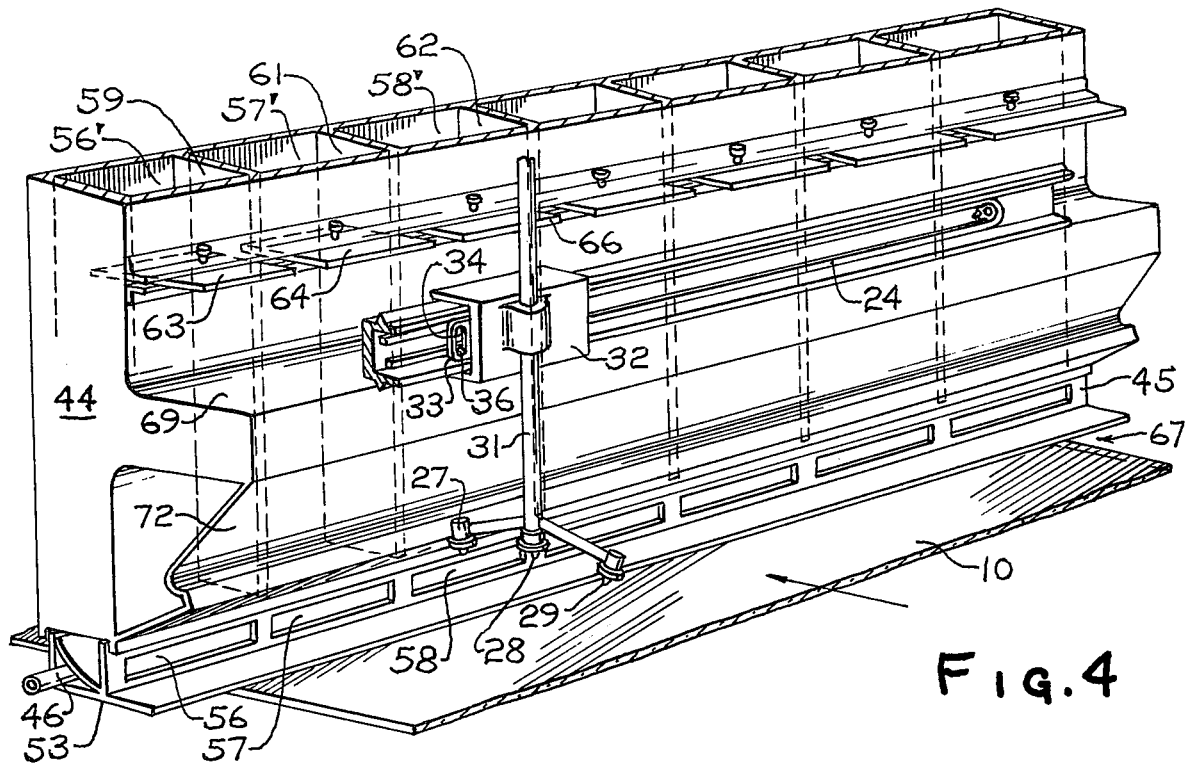
FIG. 4 is a partial perspective view of the apparatus shown in FIG. 2.

Immediately upstream and downstream of the spray chamber there is disposed a vacuum hood 44. The bottom portion 45 of each hood, which is preferably cooled, for example, by means of a water cooled pipe 46 mounted within the each bottom portion, is supported on a pair of beams 47 and 48. The beams, which span the ribbon, are each provided with a pair of jack screws 49, 51, and 52 (only three shown) suitably supported and connected to a drive motor (not shown). The drive motor is operable to adjust the vertical spacing of the bottom surface 53 of each respective hood relative to the surface of the ribbon. The hoods 44 extend vertically upward to a pair of exhaust pipes 54 and are spaced from one another sufficiently to provide clearance for the horizontal channel beam 16 and the apparatus movably supported therefrom including the spray guns 27, 28 and 29. The hoods are provided with a plurality of exhaust port opening 56, 57, 58, etc., spaced along the bottom portion of the side of each hood facing the spray chamber. The exhaust port openings communicate with the exhaust pipes 54 through separated passageways 56', 57', 58', etc., within the body of each hood. The passageways are separated from each other by means of suitable partitions 59, 61, 62, etc. shown in FIG. 4. An adjustable slide gate damper 63, 64, 66, etc., is disposed in each of the separated passageways 56', 57', 58', etc., to facilitate controlling the rate at which exhaust is drawn through each passageway. In this manner, it is readily possible to ensure that the rate of exhaust from the spray chamber 14 is substantially uniform across the width of the ribbon. It is also possible, by operating the screw jacks 49, 51 and 52 and thereby raising or lowering the bottom surface 53 of the hoods relative to the ribbon 10, to control the relative amounts of air entering the spray chamber 14 from above the spray guns and from the openings 67 and 68 between the ribbon and the respective hood bottoms.

As seen most clearly in FIG. 1 and 3, each hood 44 is provided with a generally horizontally projecting appendage 69 which extends across the width of the ribbon towards the vertical rod 31 to define a relatively narrow clearance or slot 71 through which the rod 31 is reciprocated during the spraying operation. In addition, each hood is provided with an impervious plate 72 that extends across the spray chamber from the appendage 69 toward the exhaust port openings 56, etc. to restrict the air space above the spray guns. The air space between the spray guns and the impervious plates is further restricted by means of baffles 73 and 74, hereafter referred to as slot baffles, disposed between adjacent spray guns, and by means of a shield structure 76 mounted near the lower end of each impervious plate 72. In this manner, the side walls 77 of the shields and the sides of the slot baffles define narrow slots 78, 79 and 81 through which the orifices of the respective spray guns project during their traverse of the ribbon. These narrow slots 78, 79 and 81, together with the openings 67 and 68 between the ribbon and the respective hood bottoms comprises substantially the only access for air to enter into the exhaust hoods from outside of the spray chamber. Accordingly, the narrowness of the slots 78, 79 and 81 causes air to rush past the respective spray gun origices at a relatively high velocity as it moves from above the guns toward the exhaust port openings. The movement of the high velocity air, which is illustrated schematically by the dashed arrows in FIG. 3, keeps the area surrounding the respective gun orifices substantially free from coating material. This, in turn, very substantially decreases the rate at which coating material builds up on the guns, and effectively eliminates discrete defects which are caused by droplets or flakes of coating material falling from the reciprocating guns and onto the ribbon.

In a preferred embodiment, the side wall 77 of each shield 76 is disposed at a slight angle so that the slots 78, 79 and 81 defined by the shields and slot baffles are generally parallel to the axis of the respective spray guns 27, 28 and 29. It is also preferred that the bottom wall 82 of each shield 76, the bottom surfaces 83 and 84 of the slot baffles 73 and 74, and the path traversed by the respective spray gun orifices all lay in a relatively smooth, continuous arcuate path from the upstream exhaust port openings to the downstream exhaust port openings. This generally smooth path will tend to decrease the turbulence in the exhaust flowing along the ribbon towards the respective exhaust port openings.

The slot baffles 73 and 74 may comprise square metal tubing arranged in a generally elongated U- shaped configuration and convered with a sheet metal wrapping. In a preferred embodiment, the bottom of the baffles and the ends thereof which are adjacent the edges of the ribbon are covered with an insulating material, such as an asbestos or fiber glass batt, prior to the baffles being wrapped with sheet metal. In addition, the baffles are cooled to maintain their dimensional stability, for example, by passing water through the tubing.

The ends of the slot baffles are connected to depending supports 86, 87, etc. (only two shown). The supports 86 and 87 are provided with vertically oriented slots 88, 89, 91 and 92 for receiving a bolt or other suitable fastening means. The supports are thus fastened to a suitably supported beam 93 through horizontally oriented slots 94, 96, 97 and 98, which cooperate with the vertical slots and the fastening means to facilitate adjusting the orientation and disposition of the slot baffles.

Figure 6:
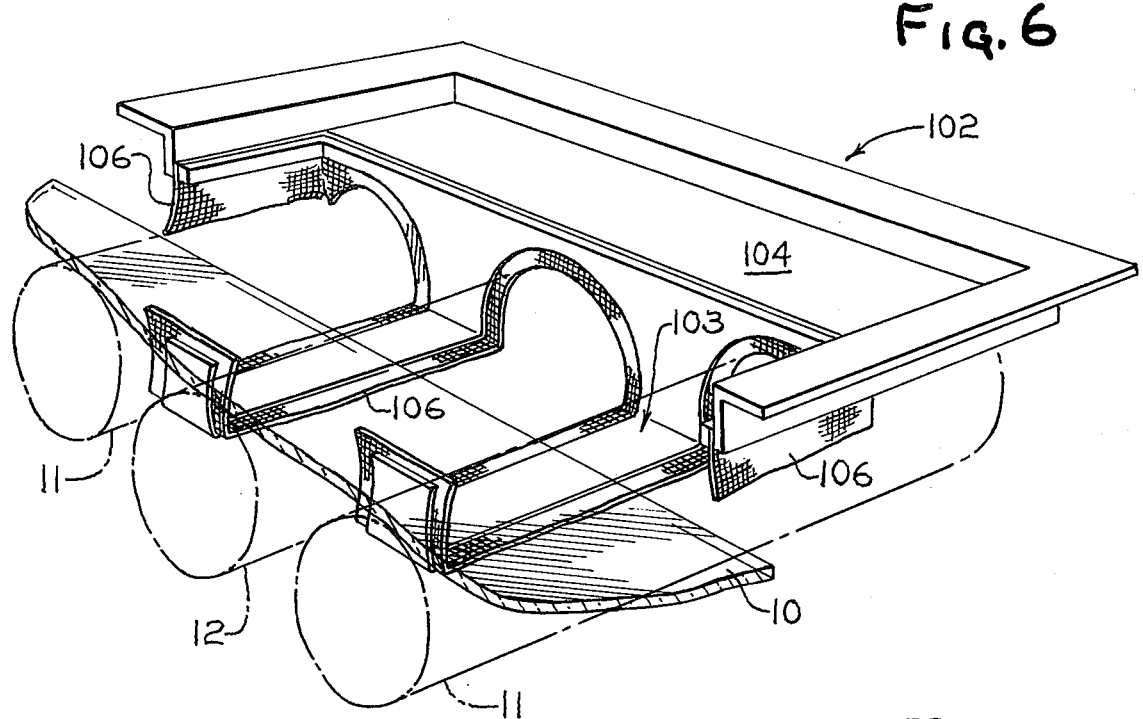
FIG. 6 is a perspective view of a roller baffle in accordance with the present invention.
Figure 7:
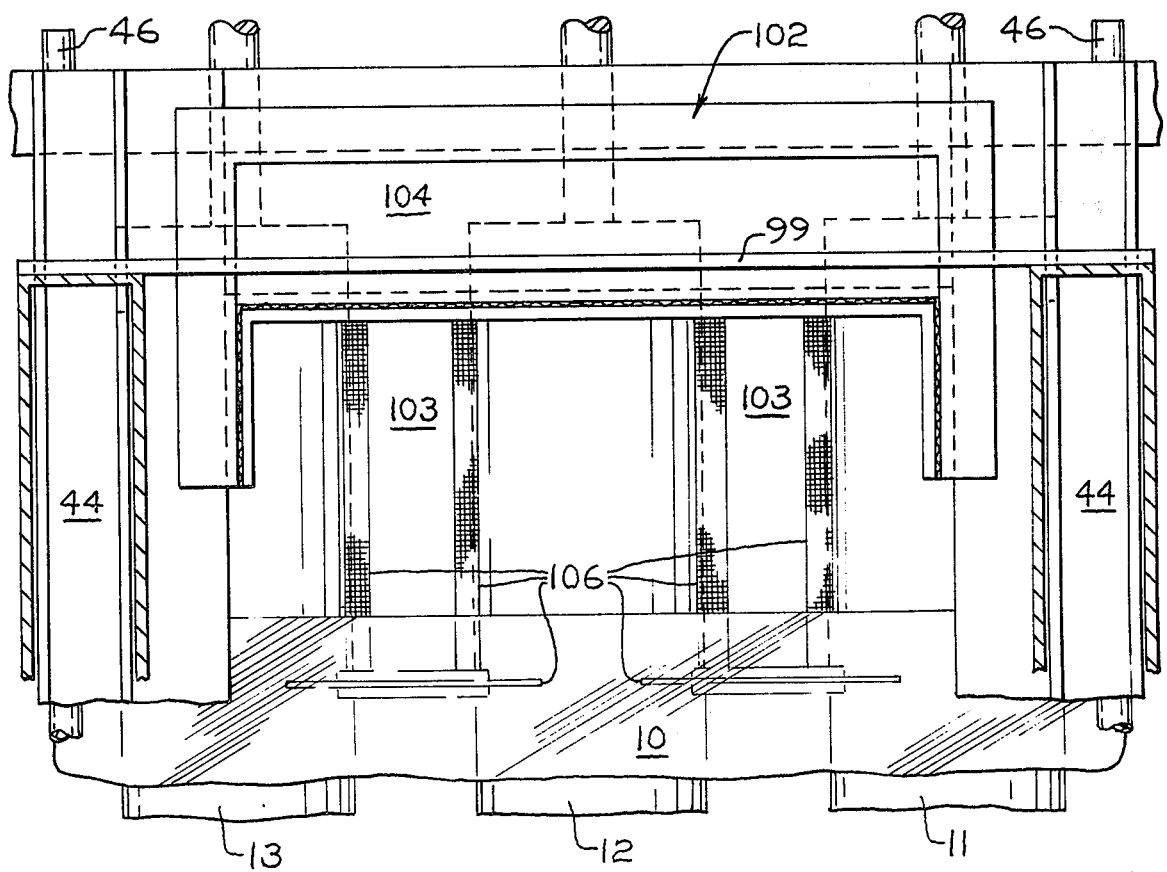
FIG. 7 is a partial plan view illustating the relative location of the roller baffle of FIG. 6 with respect to the substrate being coated.

In order to ensure that substantially all of the air and coating material that exhausts through the exhaust port openings 56, etc. flows across the ribbon 10 only in the upstream and downstream directions, a roller baffle 102 is disposed beneath each edge of the ribbon 10. The roller baffles 11 thus prevent any air from rising between the rolls 11, etc. and over the edges of the ribbon towards the exhaust port openings. A suitable roller baffle, 102, which is shown in perspective in FIG. 6, and in place in FIGS. 1, 3 and 7, comprises a tray-like configuration having a depending front portion 103 adapted to fit between the rolls. The rear portion 104 of each roller baffle may be substantially flat and should extend beyond the ends of the rolls 11, etc. where they are suitably mounted to the superstructure (not shown) that supports the rolls. The edges of each roller baffle 102 that abut the rolls 11, etc., are provided with flexible asbestos or fiber glass flaps 106. These flaps provide the desired sealing between the roller baffles 102 and the rolls 11, etc., without marring or otherwise interferring with the rolls or their operation. As seen most clearly in FIGS. 6 and 7, the roller baffles 102 do not contact the ribbon.

In a preferred embodiment, the area between the hoods 44 and adjacent the ribbon edges is closed off to the surrounding atmosphere to further preclude any transverse movement of air or coating material over the ribbon. This is accomplished, for example, by bolting or otherwise securing a vertical end baffle 99 (FIGS. 1 and 7) between the hoods beyond the laterial sides thereof. As illustrated in FIGS. 1, it is not necessary for the end baffles 99 to close off the entire space between the hoods. However, it is preferable that the top 101 of each end baffle 99 be above the ribbon a sufficient distance to substantially close the space between hoods and below the spray guns. Accordingly, the top 101 of each end baffle 99 is generally at least as high above the ribbon 10 as is the highest point of the slot baffles 73 and 74. Similarly, it is desirable to dispose the bottom portion of each baffle sufficiently low with respect to the ribbon to substantially preclude air from flowing thereacross. This may be accomplished, for example, by resting or otherwise supporting the bottom portion of the end baffles on the substantially flat rear portion 104 of the roller baffles 102.

As indicated above, the spraying means may be moved to one side when it is desired to produce regular float glass without a coating step. When this is done, it may be desirable to remove and replace the vacuum hoods 44 with refractory brick, and thereby close the space between the float tank and the lehr. To accomplish this, each vacuum hood 44 may be provided with a pair of wheels 107 formed on the upper surface of the horizontal channel beam 16. Additional wheels 108 may be attached to brackets 109 mounted to the exhaust pipe 54 to permit the exhaust pipe 54 to be moved with the hoods 44 by riding the wheels 108 along track 111 carried by the overhead beam 42. In an alternative embodiment, the hoods 44 may be left in place so long as the space between the hoods is effectively sealed. This may be accomplished, for example, removing the spray means to one side and by placing an insulated baffle (not shown) across the entire width of the ribbon between the hoods. The insulated baffle would rest, for example, on the shelf-like recesses 112 formed along the top edge of each of the shields 76.

DESCRIPTION OF THE PREFERRED EMBODIMENTS

To further illustrate the present invention and the advantages accompanying its practice, various coating compositions were applied to the upper surface of float glass having the following chemical composition as determined by wet chemical analysis for sodium and X-ray diffraction analysis for the other ingredients:

TABLE 1

TYPICAL ANALYSIS OF COMMERCIAL FLOAT GLASS

| Component | Parts By Weight |
|---|---|
| $SiO_2$ | 73.05 |
| $Na_2O$ | 13.68 |
| $K_2O$ | 0.68 |
| $CaO$ | 8.91 |
| $MgO$ | 3.85 |
| $Al_2O_3$ | 0.11 |
| $SO_3$ | 0.37 |
| $Fe_2O_3$ | 0.128 |

The coatings were applied using the equipment described above. However, as indicated in the examples which follow, some of the coating runs were performed in the absence of the end baffles 99. Others were performed in the absence of the roller baffles 102. Still others were performed in the absence of the slot baffles 73 and 74; and others in the absence of the impervious plates 72 and shields 76. In addition, several of the runs were performed when the spacing, $Sp$, of the respective spray gun orifices did not satisfy the equation:

$$S_p = \frac{R_s}{F_m} \left( \frac{Ng+n}{Ng} \right)$$

wherein $Rs$, $Fm$, $n$ and $Ng$ are defined above.

EXAMPLE 1

A ribbon of float glass 128 inches wide is advance from a float tank at a rate of 211 inches per minute. A bank of three Binks model 21 spray guns is reciprocated over a 130 inch wide path disposed above the central portion of the ribbon at 24 cycles per minute. The ribbon temperature is between 1,000° and 1,100°F. in the coating station and about 1,065°F. where the ribbon first crosses the spray.

The spray guns are mounted in a linear array and moved in unison in a direction normal to the longitudinal path of glass ribbon movement with the center gun pointed directly downward, its orifice being 11 inches above the ribbon. The other two spray guns are mounted in symmetrical relation to the first gun and pointed obliquely downward toward the center of the array with their orifices located 9 inches above the ribbon. The guns are spaced apart such that the spacing, $Sp$, at the surface of the ribbon is 11.75 inches as determined by the equation:

$$Sp = \frac{Rs}{Fm} \left( \frac{Ng+n}{Ng} \right)$$

wherein $Rs = 211$, $Fm = 24$, $n = 1$ and $Ng = 3$. The spray gun orifices are set at 0.033 inch diameter.

The vertical position of the upstream and downstream hoods are adjusted such that the bottom of each hood is parallel to the surface of the ribbon and disposed about 1 inch thereabove. The space between the hoods above the spray guns is restricted by securing the impervious plates between the horizontal appendage and the side of each hood near its exhaust port openings. The slot between the horizontal appendages, through which the spray gun manifold reciprocates, is approximately 10 inches wide. An elongated, generally, rectangular shaped water cooled slot baffle is positioned between the center spray gun and each outer gun so as to define a 4 inch slot through which the orifice of the center gun projects as it traverses the ribbon. A shield is mounted to each hood adjacent the respective outer spray gun such that the shields and the slot baffles between the spray guns define a 4 inch wide slot through which the orifices of outer guns project during their traverse of the ribbon. The configuration and position of the bottom surface of the respective shields and slot baffles are arranged to form a smooth, generally continuous contour from the upstream exhaust port openings to the downstream exhaust port openings. A roller baffle is disposed beneath and on each side of the advancing ribbon to prevent the exhaust hoods from drawing air from beneath the ribbon and over the edges thereof. A vertical end baffle approximately 15 inches high is provided on each side of the ribbon to further prevent air from flowing transversely across the surface of the ribbon and into the exhaust hoods, the bottom portion of each end baffle disposed on the rear portion of each respective roller baffle. The slide gate dampers in the hood passageways are adjusted to maintain a uniform exhaust rates over the width of the ribbon.

In this example, methylene chloride is the solvent for the coating composition. To each gallon of methylene chloride, 590 of cobalt acetylacetonate, 147 grams of ferric acetylacetonate and 199 grams of chromic acetylacetonate are added to produce a coating composition having a total of 3 percent by weight of metal in solution. The coating composition is applied at a pressure of 30 pounds per square inch for a period of 30 minutes.

The float glass ribbon is then annealed using regular annealing procedures of commercial production and the coated glass then cut to desired length. The resultant coated glass is completely free from dectactable banding and contains no noticeable discrete defects. The appearance of the cut coated glass articles so produced is acceptable for color by inspection over the central 110 inches of the ribbon's width. The marginal 9 inches or so on each side of the ribbon have a coating which is noticeably thin and must be trimmed as waste. The coating thickness is determined by using a machine sold under the trade name of Chromoscope by the Millitron Company of Pittsburgh, Pa. This machine measures the reflectance of blue light and reflectance of red light, determining the thickness of the film as a function of the ratio of said reflectances.

EXAMPLE II

The procedure of Example I is followed, except that 474 grams of cobalt acetylacetonate, 194 grams of iron acetylacetonate and 296 grams of chromium acetylacetonate are added to each gallon of methylene chloride. The coated sheets have an appearance indistinguishable to the naked eye from those resulting from coating float glass with the composition of Example I.

EXAMPLE III

The procedure of Example I is repeated, except that the spacing, $Sp$, is adjusted to 13 inches. The coated glass has noticeable banding and is commercially unacceptable.

EXAMPLE IV

The procedure of Example I is repeated, except that the spacing, $Sp$, is adjusted to 10 inches. The coated glass has noticeable banding and is commercially unacceptable.

EXAMPLE V

The procedure of Example I is repeated, except that the center gun is moved out of line with respect to the remaining guns. The angle between a line drawn through the upstream and downstream guns and a line drawn through the upstream and center guns is about 45°. The coated glass exhibits banding which is slightly detectible by the naked eye, but which is insufficient to render the coated glass unacceptable for many commercial applications.

EXAMPLE VI

The procedure of Example I is repeated, except that the shields and slot baffles are removed. The coated glass now contains discrete defects which render the coated glass unacceptable after an operating period of 5–10 minutes.

EXAMPLE VII

The procedure of Example I was repeated, except that the period during which the coating composition is applied was extended to about one hour. The coated glass was still free from noticeable banding and was still acceptably free from discrete defects.

EXAMPLE VIII

The procedure of Example I was repeated, except that the vertical end baffles were removed. The coated glass is acceptable for color uniformity only over the central 65 inches thereof.

EXAMPLE IX

The procedure of Example I is repeated except that the roller baffles are removed. The coated glass is acceptable for color uniformity only over the central 75 inches thereof.

EXAMPLE X

The procedure of Example I is repeated except that the roller baffles and the vertical end baffles are removed. The coating on the glass is of acceptable thickness only over the central 46 inches thereof, the remaining 82 inches being waste.

The above described embodiments of the present invention involving methods and apparatus for coating substrates, such as float glass, have enabled the coating art in general, and the glass art in particular, to greatly improve the yield of acceptable product by diminishing the amount of wastage caused by noticeable defects in the coated product. This improved yield manifests itself not only in the avoidance of discrete defects, but also in the effective elimination of banding. Furthermore since the present invention enables a much greater portion of a ribbon width to be coated with an acceptable thickness of coating material, it often permits the production of commercial products which cannot be readily prepared by prior art techniques. Thus, even though the invention has been described in detail in conjunction with coating ribbons of float glass with metal oxide coatings, it will be appreciated that the invention is not so limited, and that various changes may be made without departing from the spirit of the invention as defined in the claimed subject matter that follows.

What is claimed is:

1. In a method of coating a surface of a glass substrate continuously advancing along a predetermined path, the coating method comprising the steps of directing a coating medium as a diverging stream from each of at least two coating dispensing means toward the surface of the substrate at sufficient velocity to impinge on the surface of the substrate to coat same, and cyclically displacing the at least two dispensing means along a reciprocating path transverse to the predetermined path of the substrate to coat the surface of the substrate, wherein the improvement provides the surface of the substrate with a substantially uniform coating and comprises:

performing the displacing step with the at least two dispensing means on a center-to-center spacing as measured (1) at the substrate surface to be coated and (2) along the substrate path a distance approximately equal to $S_p$ for each cyclic traverse of the at least two dispersing means along the reciprocating path wherein $S_p$ is $$[S_p] = \frac{R_s}{F_m} \left( \frac{N_g + n}{N_g} \right)$$

wherein:

$R_s$ = the speed at which the substrate is advancing, in inches per minute;

$N_g$ = the number of dispensing means;

$n$ = any positive or negative whole integer other than $n = N_g$ or any multiple of $n = N_g$; and $F_m$ = the cycle speed of the dispensing means, in cycles per minute.

2. The method as set forth in claim 1, wherein the dispensing means each include a spray orifice and the spray orifices are spaced in a substantially linear configuration substantially parallel to the predetermined path of the substrate.

3. The method set forth in claim 1, wherein $n = 1$.

4. The method set forth in claim 3, wherein $N_g = 3$.

5. The method set forth in claim 3, wherein in substrate is a heated-ribbon of glass, and wherein the coating composition contains a metal compound capable of thermally reacting on contact with a hot glass surface to be converted to a colored metal oxide coating.

6. The method as set forth in claim 1 wherein the reciprocating path of the at least two dispensing means is transverse and substantially perpendicular to the predetermined path of the substrate.

7. The method as set forth in claim 1 wherein the at least two coating dispensing means each include a spray orifice and said step of performing the displacing step includes mounting adjacent spray orifices out of line with respect to the predetermined path of the advancing substrate such that an angle between the predetermined path and an imaginary line drawn through the respective adjacent orifices is less than about 45°.

8. The method as set forth in claim 1 wherein the diverging streams are fan-shaped sprays.

9. The method as set forth in claim 1 wherein adjacent streams overlap at the surface of the substrate.

10. The method as set forth in claim 9 wherein the overlap of adjacent streams is about 20% to about 40% of adjacent streams at the surface of the substrate.

11. The method as set forth in claim 1 wherein the streams are directed downward toward the surface of the substrate.

12. In a method of producing a transparent color-coated ribbon of glass wherein the ribbon of glass to be coated is formed by depositing molten glass on a liquid bath of a tin-containing molten metal to provide a ribbon of glass supported by its lower surface contacting the liquid bath, passing the supported ribbon of glass through a chamber containing a reducing atmosphere and a vapor containing tin atoms while supported with its lower surface contacting the liquid bath, until tin-containing material in the vapor introduces tin in a reduced state into the upper surface of the support ribbon to provide the upper surface with a greater concentration of tin than the interior of the ribbon, and wherein the transparent color-coated ribbon of glass is produced by displacing the ribbon of glass from the chamber through a spray chamber along a predetermined path, directing a plurality of diverging streams of a coating composition from each of a plurality of spray means downward with sufficient velocity to impinge on the upper surface of the continuously moving ribbon of glass to coat same wherein the coating composition is responsive to thermal treatment containing a metal compound capable of thermally reacting on contact with hot glass to be converted into a colored metal oxide reaction product at temperatures above about 500°F. and cyclically displacing the spray means along a reciprocating path transverse to the predetermined path, the improvement comprising:

performing the displacing step while maintaining the spray means on a center-to-center spacing as measured (1) at the upper surface of the ribbon and (2) along the ribbon path a distance approximately equal to $S_p$ for each cyclically traverse of the spray means wherein $S_p$ is $$[S_p] = \frac{R_s}{F_m} \left( \frac{N_g + n}{N_g} \right)$$

wherein:

$R_s$ = the speed at which the ribbon is advancing through the spray chamber, in inches per minute;

$N_g$ = the number of spray means;

$n$ = any positive or negative whole integer other than $n = N_g$ or any multiple of $n = N_g$; and $F_m$ = the cycle speed of the spray means, in cycles per minute.

13. The method of claim 12, wherein $n_g = 3$, $n = 1$, and the spray means are arranged in a substantially linear configuration substantially parallel to the path of the ribbon.

14. The method according to claim 12 wherein the streams are spaced in a substantially linear configuration parallel to the predetermined path of the glass ribbon.

15. The method according to claim 12 wherein the plurality of spray means each include a spray orifice and said step of performing the displacing step includes mounting adjacent spray orifices out of line with respect to the predetermined path of the glass ribbon such that an angle between the predetermined path and imaginary line drawn through the respective adjacent orifices is less than about 45°.

16. The method according to claim 12 wherein the reciprocating path of the spray means is transverse and substantially perpendicular to the predetermined path of the glass ribbon.

17. The method according to claim 16 wherein the streams impinge on the upper surface of the glass ribbon as fan-shaped sprays.

18. The method as set forth in claim 17 wherein adjacent sprays overlap at the upper surface of the glass ribbon.

19. The method as set forth in claim 18 wherein the sprays overlap about 20% to about 40% of the diameter of the spray at the upper surface of the glass ribbons.

* * * * *

UNITED STATES PATENT OFFICE
CERTIFICATE OF CORRECTION

PATENT NO. : 3,885,066
DATED : May 20, 1975
INVENTOR(S) : Ronald L. Schwenninger It is certified that error appears in the above-identified patent and that said Letters Patent are hereby corrected as shown below:

Claim 1, in the formula, omit $[S_p=]$

Claim 12, line 11 "support" should be --supported--.

Claim 12, in the formula, omit $[S_p]$.

Signed and Sealed this thirtieth Day of September 1975

[SEAL]

Attest:

RUTH C. MASON
*Attesting Officer*

C. MARSHALL DANN
*Commissioner of Patents and Trademarks*